(12) United States Patent
Yu et al.

(10) Patent No.: US 8,826,220 B2
(45) Date of Patent: Sep. 2, 2014

(54) CIRCUIT LAYOUT METHOD FOR PRINTED CIRCUIT BOARD, ELECTRONIC DEVICE AND COMPUTER READABLE RECORDING MEDIA

(71) Applicant: Wistron Corp., New Taipei (TW)

(72) Inventors: Wei-Fan Yu, New Taipei (TW); I-Ping Teng, New Taipei (TW)

(73) Assignee: Wistron Corp., New Taipei (TW)

( * ) Notice: Subject to any disclaimer, the term of this patent is extended or adjusted under 35 U.S.C. 154(b) by 0 days.

(21) Appl. No.: 13/857,997

(22) Filed: Apr. 6, 2013

(65) Prior Publication Data
US 2013/0326453 A1    Dec. 5, 2013

(30) Foreign Application Priority Data
Jun. 1, 2012    (TW) .................................. 101119793

(51) Int. Cl.
*G06F 17/50*    (2006.01)

(52) U.S. Cl.
CPC ........ *G06F 17/5081* (2013.01); *G06F 17/5068* (2013.01); *G06F 2217/82* (2013.01)
USPC .......................................... 716/137; 716/115

(58) Field of Classification Search
USPC ................................................ 716/137, 115
See application file for complete search history.

(56) References Cited

U.S. PATENT DOCUMENTS

| | | | | |
|---|---|---|---|---|
| 4,658,334 A * | 4/1987 | McSparran et al. | .......... | 361/800 |
| 4,739,453 A * | 4/1988 | Kurokawa | ...................... | 361/816 |
| 8,248,814 B2 | 8/2012 | Chen et al. | | |
| 2002/0113673 A1 * | 8/2002 | Crescenzi et al. | ............. | 333/247 |
| 2004/0127249 A1 * | 7/2004 | Hankui et al. | .............. | 455/550.1 |
| 2005/0239418 A1 * | 10/2005 | Koh et al. | ..................... | 455/90.3 |
| 2008/0230258 A1 * | 9/2008 | Shen et al. | ..................... | 174/251 |
| 2010/0126010 A1 * | 5/2010 | Puzella et al. | ................... | 29/852 |
| 2011/0297432 A1 * | 12/2011 | Xie | ............................... | 174/262 |
| 2012/0279774 A1 * | 11/2012 | Niman | .......................... | 174/262 |

\* cited by examiner

*Primary Examiner* — Stacy Whitmore
*Assistant Examiner* — Magid Dimyan
(74) *Attorney, Agent, or Firm* — Li & Cai Intellectual Property (USA) Office

(57) ABSTRACT

The present disclosure illustrates a circuit layout method for printed circuit board which is adapted for an electronic device. The circuit layout method includes the following steps. A parameters configuration interface is provided for receiving corresponding stack-up parameters and a plurality of layout parameters. A radio frequency layer, a first keep out layer, and a reference layer are determined based on the stack-up parameters. The first keep-out layer is placed between the radio frequency layer having a first signal trace disposed thereon and the reference layer. A first keep-out region on the first keep-out layer is formed in corresponding to the first signal trace. Circuit layouts disposed inside the first keep-out region are removed. Consequently, the corresponding keep-out region may be automatically generated in accordance to the signal requirements of the signal trace while designing the circuit layout thereby increase circuit layout quality and efficiency thereof.

22 Claims, 12 Drawing Sheets

| Stackup | | | Thickness mil | Impedance request list | | | | |
|---|---|---|---|---|---|---|---|---|
| | | | | | Layer impedance | L1(reference layer) | L3(reference layer) | L4(reference layer) | L5(reference layer) |
| | | | | single-end trace(trace width:mil) | | | | |
| L1 | TOP | | 1.7 | 27.4Ω | 12.5(L2) | 14.5(L2/L5):13.0(L2/L4) | 14.5(L2/L5) | 14.5(L4/L7) |
| L2 | G/P | PP | 2.7 | 33Ω | 9.0(L2) | 11.0(L2/L5):9.5(L2/L4) | 11.0(L2/L5) | 11.0(L4/L7) |
| L3 | Signal | Core | 1.2 | 35Ω | 8.5(L2) | 10.0(L2/L5):8.5(L2/L4) | 10.0(L2/L5) | 10.0(L4/L7) |
| L4 | S/G/P | PP | 4.0 | 37.5Ω | 7.5(L2) | 8.5(L2/L5):7.5(L2/L4) | 8.5(L2/L5) | 8.5(L4/L7) |
| L5 | S/G/P | Core | 1.2 | 39Ω | 6.7(L2) | 8.0(L2/L5):7.0(L2/L4) | 8.0(L2/L5) | 8.0(L4/L7) |
| | | PP | 9.0 | … | … | … | … | … |
| | | | 1.2 | Differential trace(trace width/spacing/trace width:mil) | | | | |
| | | | 4.0 | 110Ω | 3.5/10/3.5(L2) | NA | NA | NA |
| L6 | Signal | PP | 1.2 | 100Ω | 3.5/6/3.5(L2);4/10/4(L2) | 3.5/7/3.5(L2/L5);3.5/8/3.5(L2/L4) | 3.5/7/3.5(L2/L5) | 3.7/7/3.5(L4/L7) |
| L7 | G/P | Core | 4.0 | 95Ω | 3.5/5.5/3.5(L2);4/8/4(L2) | 4/7/4(L2/L5);3.5/6/3.5(L2/L4);4/8/4(L2/L4) | 4/7/4(L2/L5) | 4/7/4(L4/L7) |
| | | PP | 1.2 | 93Ω | 4/6/4(L2) | 4/6/4(L2/L5);4/7/4(L2/L4) | 4/6/4(L2/L5) | 4/6/4(L4/L7) |
| L8 | Bottom | | 2.7 | 90Ω | | 4/5/4(L2/L5);4/5.5/4(L2/L4) | 4/5/4(L2/L5) | 4/5/4(L4/L7) |
| | | | 1.7 | 85Ω | 4/4.5/4(L2);5/8/5(L2) | 4/4/4(L2/L5);4/4/4(L2/L4) | 4/4/4(L2/L5) | 4/4/4(L4/L7) |
| | | | | … | … | … | … | … |

FIG. 3

CIRCUIT LAYOUT METHOD FOR PRINTED CIRCUIT BOARD, ELECTRONIC DEVICE AND COMPUTER READABLE RECORDING MEDIA

BACKGROUND

1. Technical Field

The present disclosure relates to a circuit layout method and an electronic device thereof, in particular, to a circuit layout method for printed circuit board, an electronic device thereof and a computer readable recording medium.

2. Description of Related Art

When designing the circuit layout on a printed circuit board (PCB), certain traces (e.g., single-end trace or differential trace) may require impedance control according to the product design requirement, such as configuring corresponding trace width, spacing, length, thickness, and so on) to obtain the desired signal transmission quality.

In circuit layout design, regardless whether the reference layer of which the signal trace corresponds to is placed in adjacent to the signal trace or not all have decisive impact on the impedance of the signal trace being controlled. Hence, whenever a signal trace on PCB is referencing the wrong reference layer, would cause the impedance value of the specific signal trace to vary and become incorrect. The transmission quality and stability of the signal trace will be affected which in turns causes instability in the product system, or causes the product not been able to function at all. Consequently, the finished PCB becomes scrap and increases the overall product development time and cost.

However, the existing PCB design software requires the operator to conduct manual operations to resolve the aforementioned problems, i.e., the operator has to manually create the keep-out region in the non-corresponding cooper surface for each and every signal trace with impedance control so as to avoid variations in the impedance of the signal traces. Moreover whenever updating or modifying the circuit layout, the designer has to reconfigure the keep-out region in the circuit layout for each and every signal trace, one at a time. This not only reduces the design efficiency but also easy for operator to have omissions. Additionally, the corresponding inspection also requires the operator to conduct manually hence very easily to have misjudgments or omissions, causing the finished product malfunctions thereby increase the product cost.

SUMMARY

Henceforth, an exemplary embodiment of the present disclosure provides a circuit layout method for printed circuit board. The provided method can automatically establish corresponding keep-out region in circuit layout according to the requirement of signal quality during circuit design process, thereby increase the quality and the efficiency of the circuit layout, further increases the yield rate of finished product.

An exemplary embodiment of the present disclosure provides a circuit layout method for printed circuit board, which is adapted for an electronic device. The method includes the following steps. First, A parameter configuration interface for receiving stack-up parameters and a plurality of layout parameters is provided. Subsequently, a radio frequency layer, a first keep-out layer, and a reference layer are determined according to the stack-up parameters, wherein the first keep-out layer is placed between the radio frequency layer having a first signal trace disposed thereon and the reference layer. Next, a first keep-out region in corresponding to the first signal trace is formed in the first keep-out layer. Lastly, the circuit layout in the first keep-out region is removed.

According to one exemplary embodiment of the present disclosure, the step for forming the first keep-out region in corresponding to the first signal trace in the first keep-out layer includes configuring the area of the first keep-out region according to the layout parameters, wherein the first keep-out region covers an orthographic projection area of the first signal trace project on the first keep out layer.

According to one exemplary embodiment of the present disclosure, the method further includes forming a pin keep-out region around a surface mount device (SMD) pin disposed on the first signal trace. Next, the area of the pin keep-out region is determined according to the layout parameters. Then, the circuit layout in the pin keep-out region is removed.

According to one exemplary embodiment of the present disclosure, the method further includes s forming a thru pin keep-out region around a thru pin disposed on the first signal trace. Next, the area of the thru pin keep-out region is determined according to the layout parameters. Then, the circuit layout in the thru pin keep-out region is removed.

According to one exemplary embodiment of the present disclosure, the method further includes forming a via keep-out region around a via disposed on the first signal trace. Next, the area of the via keep-out region is determined according to the layout parameters. Then, the circuit layout in the via keep-out region is removed.

According to one exemplary embodiment of the present disclosure, the method further includes forming a shape keep-out region around a shape disposed on the first signal trace. Next, the area of the shape keep-out region is determined according to the layout parameters. Then, the circuit layout in the shape keep-out region is removed.

According to one exemplary embodiment of the present disclosure, the method further includes forming a trace keep-out region around a trace disposed on the first signal trace. Next, the area of the trace keep-out region is determined according to the layout parameters is determined. Then, the circuit layout in the trace keep-out region is removed.

According to one exemplary embodiment of the present disclosure, the method further includes adjusting the area of first keep-out region on the first keep-out layer according to the SMD pin keep-out region, the thru pin keep-out region, the via pin keep-out region, the shape keep-out region, and/or the trace keep-out region An exemplary embodiment of the present disclosure provides an electronic device which includes a display unit, a storage unit, and a process unit. The display unit is used for displaying a parameter configuration interface. The storage unit is used for storing a plurality of stack-up parameters and a plurality of layout parameters. The process unit is used for executing the following steps including providing a parameter configuration interface for receiving a stack-up parameters and a plurality of layout parameters; determining a radio frequency layer, a first keep-out layer, and a reference layer according to the stack-up parameters, wherein the first keep-out layer is placed between the radio frequency layer having a first signal trace disposed thereon and the reference layer; forming a first keep-out region in corresponding to the first signal trace in the first keep-out layer; removing the circuit layout in the first keep-out region.

Furthermore, an exemplary embodiment of the present disclosure provides a computer readable recording medium which stores a computer executable program. When the computer readable recording medium is read by a processor, the processor executed the aforementioned method.

To sum up, the present disclosure provides a circuit layout method which actively forms a plurality of keep-out regions in corresponding to the impedance controlled signal traces according to the stack-up parameters and layout parameters, wherein the designer can configure the area of the keep-out region at any time to have the signal trace in the circuit layout fulfilling to the signal quality requirements of product. Hence, the designer can through utilizing the circuit layout method reduce the circuit layout time while increase the circuit layout accuracy. Accordingly, the overall circuit layout design efficiency can be increased while the associated product cost and development time can be reduced.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

FIG. 3 is a diagram depicting a portion of a stack-up table for a printed circuit board provided in accordance to the first exemplary embodiment of the present disclosure.

FIG. 5-1 and FIG. 5-2 respectively are flowchart diagrams illustrating circuit layout method for a printed circuit board provided in accordance to the second exemplary embodiment of the present disclosure.

DESCRIPTION OF THE EXEMPLARY EMBODIMENTS

Figure 1:
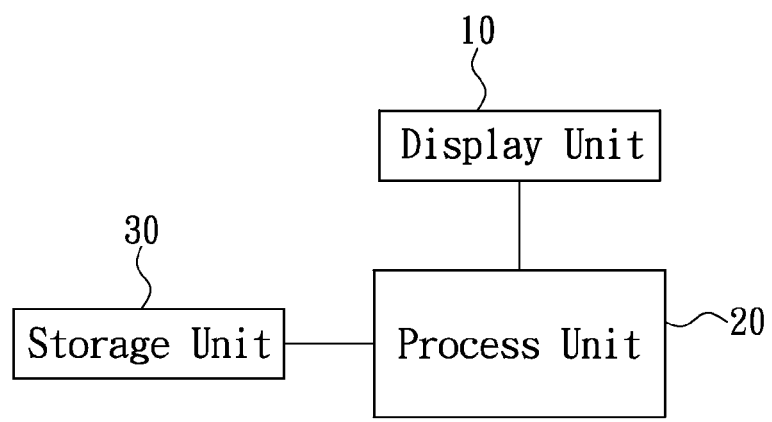
FIG. 1 is a block diagram of an electronic device provided in accordance to the first exemplary embodiment of the present disclosure.

Reference will now be made in detail to the exemplary embodiments of the present disclosure, examples of which are illustrated in the accompanying drawings. Wherever possible, the same reference numbers are used in the drawings and the description to refer to the same or like parts.

First Exemplary Embodiment

Please refer to FIG. 1, which is a block diagram illustrates an electronic device provided in accordance to the first exemplary embodiment of the present disclosure. The electronic device 1 includes a display unit 10, a processing unit 20, and a storage unit 30. The display unit 10 and the storage unit 30 are coupled to the processing unit 20, respectively. The electronic device 1 in the instant embodiment may be implemented by a computer device, such as a desktop, a notebook or a tablet, however, the present disclosure is not limited thereto.

The display unit 10 is used for displaying a parameter configuration interface (not shown in FIG. 1), for a designer to input parameter data corresponding to a circuit layout of a printed circuit board. The parameter data includes stack-up parameters and layout parameters. Specifically, the stack-up parameters include the controlled radio frequency layers and the corresponding keep-out layers. The layout parameters include the layout definition of the layout object disposed on the signal trace, such as a SMD pin, a thru pin, a via, a shape, and etc. as well as the area configuration parameters associated with the corresponding keep-out regions.

The processing unit 20 is the processing core of the electronic device 1. The processing unit 20 is used for generating a parameter configuration interface, and executing various analyses and processing operations according to the stack-up parameters and the layout parameters inputted by designer. The processing unit 20 generates the corresponding circuit layout through processing and analyzing the configurations received from the parameter configuration interface. The processing unit 20 may take form of a processing chip e.g., a central processing unit (CPU), a microcontroller, an embedded controller, and so on, however, the present disclosure is not limited thereto.

The storage unit 30 is used for storing a plurality of stack-up parameters and a plurality of layout parameters. It is worth to mention that in the instant embodiment, the storage unit 30 may be a volatile or non-volatile memory, including but not limited to flash memory chip, read-only memory chip, or random access memory chip.

The processing unit 20 is used for actively generating a plurality of keep-out regions and removing the circuit layout therein in accordance to a selected signal trace in circuit layout based on the designer-configured stack-up parameter and layout parameters on the parameter configuration interface. So that the impedance of the selected signal trace can be designed to have the desired value. Thus, the occurrence of the signal trace not meeting the product requirement causing the finished PCB to be discard as scrap due to variation in the impedance value of the signal trace can be prevented.

Figure 2A:
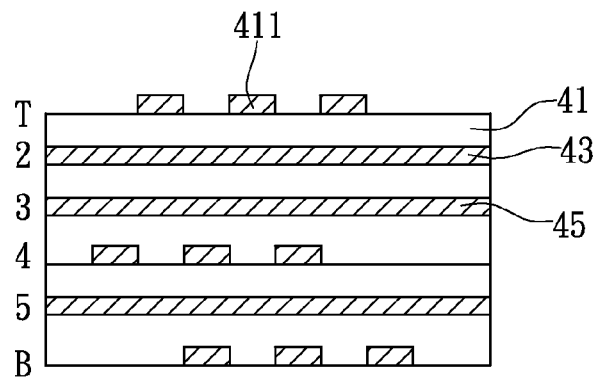
FIG. 2A to FIG. 2C are diagrams respectively illustrating a stack-up of a printed circuit board provided in accordance to the first exemplary embodiment of the present disclosure.
Figure 2B:
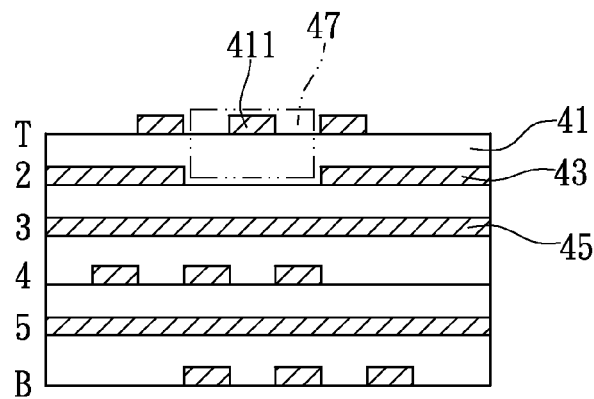
Figure 2C:
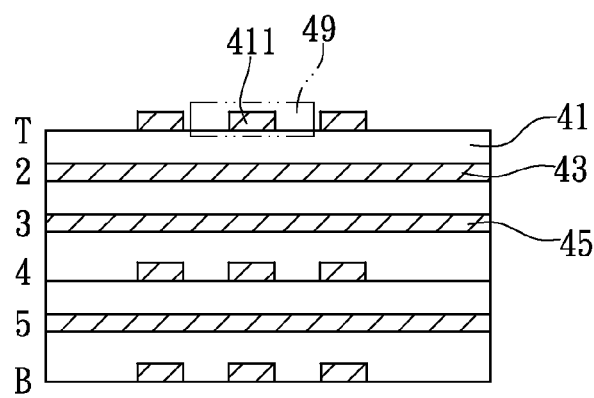

The generation method of the circuit layout keep-out region in the instant embodiment refers to FIG. 2A to FIG. 2C. Please refer to FIG. 2A to FIG. 2C, which are diagrams illustrating a printed circuit board provided in accordance to the first exemplary embodiment of the present disclosure. FIG. 2A is a diagram illustrating six-layer printed circuit board. The radio frequency layer 41 is the first layer of the six-layer printed circuit board, and has a first signal trace 411. The reference layer 45 is the third layer of the six-layer printed circuit board, and is the reference layer in corresponding to the first signal trace 411. The first keep-out layer 43 is the second layer of the six-layer printed circuit board. Since the first keep-out layer 43 is not the corresponding reference layer for the first signal trace 411, thus to eliminate effects of the second layer (i.e., the first keep-out layer 43) on the first signal trace 411 e.g. impedance, the transmission quality and etc., a keep up region must be formed on the first keep-out layer 43 in corresponding to the first signal trace 411. The first keep-out layer 43 and the reference layer 45 may each be a power layer, a ground layer, or a radio frequency layer, however, the present disclosure is not limited thereto.

Specifically, when designer inputs the stack-up parameter and the layout parameters corresponding to FIG. 2A in the parameter configuration interface. The stack-up parameter and the layout parameters are instantly stored in the storage unit 30. As depicted in FIG. 2B, the processing unit 20 determines the radio frequency layer 41, the first keep-out layer 43, and the reference layer 45 according to the user-configured stack-up parameters and layout parameters. The processing unit 20 then forms a first keep-out region 47 in corresponding to placement of the first signal trace 411 on the first keep-out layer 43, and removes the circuit layout inside the first keep-out region 47. So that the first signal trace 411 corresponds only to the reference plane on the reference layer 45 thereby eliminate the issue of having the first signal trace 411 corresponding to a wrong reference layer.

Furthermore, the processing unit 20 configures the keep-out region 47 in corresponding to the layout parameters and the routing parameters of the first signal trace 411 (e.g., trace width, spacing and length). In other words, the first keep-out region 47 formed by the processing unit 20 covers an orthographic projection area which the first signal trace 411 projects on the first keep out layer 43. It is worth to note that the instant embodiment takes single-end trace as illustration example, but in practice the radio frequency layer 41 may have differential trace, for instance formed by a first and a second signal traces. Hence, the first keep-out region 47 then covers an orthographic projection region of the first and the second signal traces.

Incidentally, if there are a plurality of keep-out layers placed between the radio frequency layer 41 and the reference layer 45, the processing unit 20 determines the keep-out layers and respectively forms a plurality of keep-out regions on these non-corresponding reference layers according to the stack-up parameters. Each of the plurality of keep-out regions corresponds to an orthographic projection region of which the first signal trace 411 on the radio frequency layer 41 projects. For instance, suppose a first keep-out layer and a second keep-out layer existed between the radio frequency layer 41 and the reference layer 45, the processing unit 20 will then respectively generates the first keep-out region and the second keep-out region on the first keep-out layer and the second keep-out layer. So that the reference layer 45 becomes the reference plane for the first signal trace 411 on the radio frequency layer 41.

For another instance, suppose the first signal trace 411 on the radio frequency layer 41 and a signal trace on the fourth layer of six-layer board form a broadside coupled differential pair. Then the second layer of the six-layer printed circuit board is thus the first keep-out layer and the third layer of the six-layer printed circuit board is the second keep-out layer. Hence, the processing unit 20 computes and forms the first keep-out region and the second keep-out region respectively on the second and the third layers of the six-layer printed circuit board.

Please refer to FIG. 2C, the processing unit 20 may form the keep-out region 49 around the first signal trace 411 on the radio frequency layer 41 in corresponding to the stack-up parameters inputted by the designer. So that the impact of the nearby components on impedance of the first signal trace 411 causing degration of the signal transmission quality of the first signal trace 411 may be avoided.

The first signal trace 411 may have a SMD pin, a thru pin, a via, or a shape disposed thereon according to the circuit layout design. Therefore, the processing unit 20 may dispose the corresponding keep-out region 49 respectively around the first signal trace 411 and the components being disposed on the first signal traces according to the area parameters of the keep-out region in the layout parameters.

To put it concretely, the processing unit 20 may dispose a pin keep-out region (not shown), a thru pin keep-out region (not shown), a via keep-out region (not shown), a shape keep-out region (not shown) and a trace keep-out region (not shown). The pin keep-out region is disposed around a SMD pin on the first signal trace 411. The thru pin keep-out region is disposed around a thru pin on the first signal trace 411. The via keep-out region is disposed around a via on the first signal trace 411. The shape keep-out region is disposed around a shape on the first signal trace 411. The trace keep-out region is disposed around a trace on the first signal trace 411.

Specifically, the processing unit 20 determines the area associated with the pin keep-out region, the thru pin keep-out region, the via keep-out region, the shape keep-out region, and the trace keep-out region according to the layout parameters. Then, the processing unit 20 removes the circuit layout inside the pin keep-out region, the thru pin keep-out region, the via keep-out region, the shape keep-out region, and the trace keep-out region. At the same time, the processing unit 20 correspondingly adjusts the area of the first keep-out region 47 on the first keep-out layer 43 according to the pin keep-out region, the thru pin keep-out region, the via keep-out region, the shape keep-out region, and the trace keep-out region. Henceforth, the effect of the nearby layout components or the adjacent non-corresponding reference layers on the first signal trace 411 may be eliminated thereby increase the circuit layout quality and efficiency thereof.

Moreover, after completely establishing all the keep-out regions on the circuit layout, the processing unit 20 can actively inspect the overall circuit layout. To put it concretely, the processing unit 20 may verify the layout parameters (e.g., trace width, spacing, and etc.) associated with the first signal trace 411 and the definition of the reference layer according to a stack-up table so as to check and determine the variation in the impedance of the signal trace.

Refer to FIG. 3, which is a diagram illustrating a portion of a stack-up table for printed circuit board provided in accordance to the first exemplary embodiment of the present disclosure. The stack-up table in FIG. 3 may be generated by the designer through external printed circuit board stack-up design software and used for inspecting the circuit layout. The stack-up table may include number of layers in the printed circuit board, the type of layers, the type of the signal trace (e.g., single-end trace or differential trace), the reference layer corresponds to the signal trace, the impedance of signal trace, and the related layout parameter data (e.g., trace width and spacing). Those skilled in the art should be able to deduce the stack-up table generation and implementation methods thus further descriptions are therefore omitted.

The processing unit 20 may determine whether the impedance of the first signal trace 411 exceeding a predefined impedance range through comparing the impedance of the first signal trace 411 with the impedance data in the stack-up table of FIG. 3. Additionally, when the impedance of the first signal trace 411 exceeds the predefined impedance range, the processing unit 20 generates an erroneous impedance detection data and displays on the display unit 10 for designer to view. At the same time, the erroneous impedance detection data is stored in the storage unit 30. The designer may correspondingly correct the circuit layout according to the erroneous impedance detection data, so as to ensure the impedance of the first signal trace 411 falls in the predefined impedance range.

Additionally, the processing unit 20 determines whether the definition of reference plane for the first signal trace is correct. In other words, the processing unit 20 determines whether the definition of the reference layer for the first signal trace 411 is the same as the definition of reference layer configured in the stack up table. When the definition of the reference layer is wrong, the processing unit 20 generates a reference plane detection data displayed through the display unit 10 for designer to view and is stored in the storage unit 30. The designer correspondingly corrects the circuit layout according to the reference plane detection data.

The processing unit 20 verifies the established keep-out region, namely the first keep-out region 47 of the first keep out layer 43 in FIG. 2B and the keep-out region 49 of the radio frequency layer 41 in FIG. 2C to determine whether the circuit layout inside the first keep-out region 47 and the keep-out region 49 have been removed. As mentioned previously, the keep-out region 49 can include the trace keep-out region corresponding to the first signal trace 411, the pin keep-out region corresponding to a SMD pin on the first signal trace 411, the thru pin keep-out region corresponding to a thru pin on the first signal trace 411, the via keep-out region corresponding to a via on the first signal trace 411, and the shape keep-out region corresponding to a shape on the first signal trace 411. When the keep-out regions established still contain circuit layout, the processing unit 20 generates a keep-out region inspection data which is displayed on the display unit 10 for designer to view. The keep-out region inspection data is also stored in the storage unit 30. The designer correspondingly removes the circuit layout according to the keep-out region inspection data to correct the circuit layout.

The instant embodiment also provides an implementation for a parameter configuration interface. Please refer to FIG. 4, which shows a diagram illustrating a parameters configuration interface provided by the electronic device 1 in accordance to first exemplary embodiment of the present disclosure. The parameters configuration interface 101 includes a radio frequency layer selection menu 103, a keep-out layer selection menu 105, a keep-out region configuration field 107, and a layout object selection field 109. The designer may generate the stack-up parameters by configuring the radio frequency layer selection menu 103 and the keep-out layer selection menu 105. The designer may generate the layout parameters by configuring the keep-out region configuration field 107 and the layout object selection field 109.

The radio frequency layer selection menu 103 is a drop-down menu and is used for providing the designer with selection of the names associated with the radio frequency layers having the impedance controlled signal trace (e.g., the radio frequency layer 41). The keep-out layer selection menu 105 is also in a form of a drop-down menu, and is used for providing the designer with selection of name associated with the keep-out layers (e.g., the first keep-out layer 43. The radio frequency layer selection menu 103 and the keep-out layer selection menu 105 can be configured in accordance to the requirements of designer, but the present disclosure is not limited thereto. The radio frequency layer selection menu 103 and the keep-out layer selection menu 105 can be viewed as the stack-up parameter configuration interface, but the present disclosure is not limited thereto.

The keep-out region configuration field 107 is used for providing designer with area configuration of the keep-out region in corresponding to the signal trace (i.e., trace) and the layout component disposed thereon (e.g., a pin, a via, a shape, and so on). In other words, the designer can configure the area associated with the trace keep-out region, the pin keep-out region, the thru pin keep-out region, the via keep-out region, or the shape keep-out region in the keep-out region configuration field 107. It is worth to note that the keep-out region configuration parameters providing in keep-out region configuration field 107 can be modified according to the actual circuit layout and the present disclosure is not limited thereto.

The layout object selection field 109 can be used to provide designer with selection of layout objects (e.g., a SMD pin, a thru pin, a via, a shape, and so on) disposed on the signal trace. The processing unit 20 can generate the corresponding keep-out regions according to the selected layout objects being disposed on the signal trace in keep-out region configuration field 107. It is worth to note that the options providing by the layout object selection field 109 can be adjusted according to the actual circuit layout, but the present disclosure is not limited thereto. The keep-out region configuration field 107 and the layout object selection field 109 can be viewed as the layout parameters configuration interface, but the present disclosure is not limited thereto.

For example, if the designer wants to form the keep-out region on the non-corresponding reference layer, as shown in FIG. 2B, the designer can select the name of the layer in corresponding to radio frequency layer 41 in the radio frequency layer selection menu 103 of the parameters configuration interface 101, such as L1 or top. Next, the designer can select the name of the keep-out layers such as L3, in the keep-out layer selection menu 105. Subsequently, the designer may input the required area coverage in the keep-out region configuration field 107. At the same time, the designer can select the layout objects which have been disposed on the first signal trace 411 in the layout object selection field 109. The processing unit 20 then forms the first keep-out region 47 on the first keep-out layer 43 according to the designer's configuration, and removes the circuit layout inside the first keep-out region 47. The area of first keep-out region 47 is defined by the entries entered in the keep-out region configuration field 107.

Then again, suppose the designer wants to dispose the keep-out region around the signal trace as shown in FIG. 2C, the designer selects the name of the layer in corresponding to the radio frequency layer 41 in the parameters configuration interface 101, such as L1 or top. Next, in the keep-out layer selection menu 105, the designer selects the name of the keep-out layers which is the same as configured in the radio frequency layer selection menu 103, i.e., the radio frequency layer 41. Subsequently, the designer inputs the required area coverage in the keep-out region configuration field 107. At the same time, the designer can select the layout objects which have been disposed on the first signal trace 411 in the layout object selection field 109. Subsequently, the processing unit 20 forms the keep-out region 49 around the first signal trace 411 on the radio frequency layer 41. The processing unit 20 simultaneously forms the keep-out region 49 around the layout objects which have been disposed on the first signal trace 411. The area of the keep-out region 49 is defined by the entries in the keep-out region configuration field 107.

Accordingly, the designer may quickly and accurately establish the keep-out region in corresponding to the selected signal trace in the circuit layout according to the product required signal quality to eliminate the possible factors that may affect the impedance of the signal trace. The stability and efficiency of circuit layout may be increase, thereby reduce the product cost and the associated development time.

It is noteworthy that FIG. 2A to FIG. 2C only serve to illustrate one possible stack-up structure of six-layer printed circuit board provided in accordance to the first exemplary embodiment of the present disclosure. FIG. 3 only serves to illustrate a portion of the stack-up table for printed circuit board provided in accordance to the first exemplary embodiment of the present disclosure. The actual content in the stack-up table of FIG. 3 may vary according to the actual circuit layout design, and the present disclosure is not limited thereto. Similarly, FIG. 4 only serve to illustrate an implementation of the parameters configuration interface in accordance to the first exemplary embodiment of the present disclosure, such that the actual content may change according to an actual circuit layout design requirement, and the present disclosure is not limited thereto. The exact type, actual structure, and/or implementation method associated with the electronic device 1, the display unit 10, the processing unit 20, and the storage unit 30 may depend on specific design and/or operational requirement and shall not be limited to the examples provided by the instant embodiment.

Second Exemplary Embodiment

Figures 1, 5:
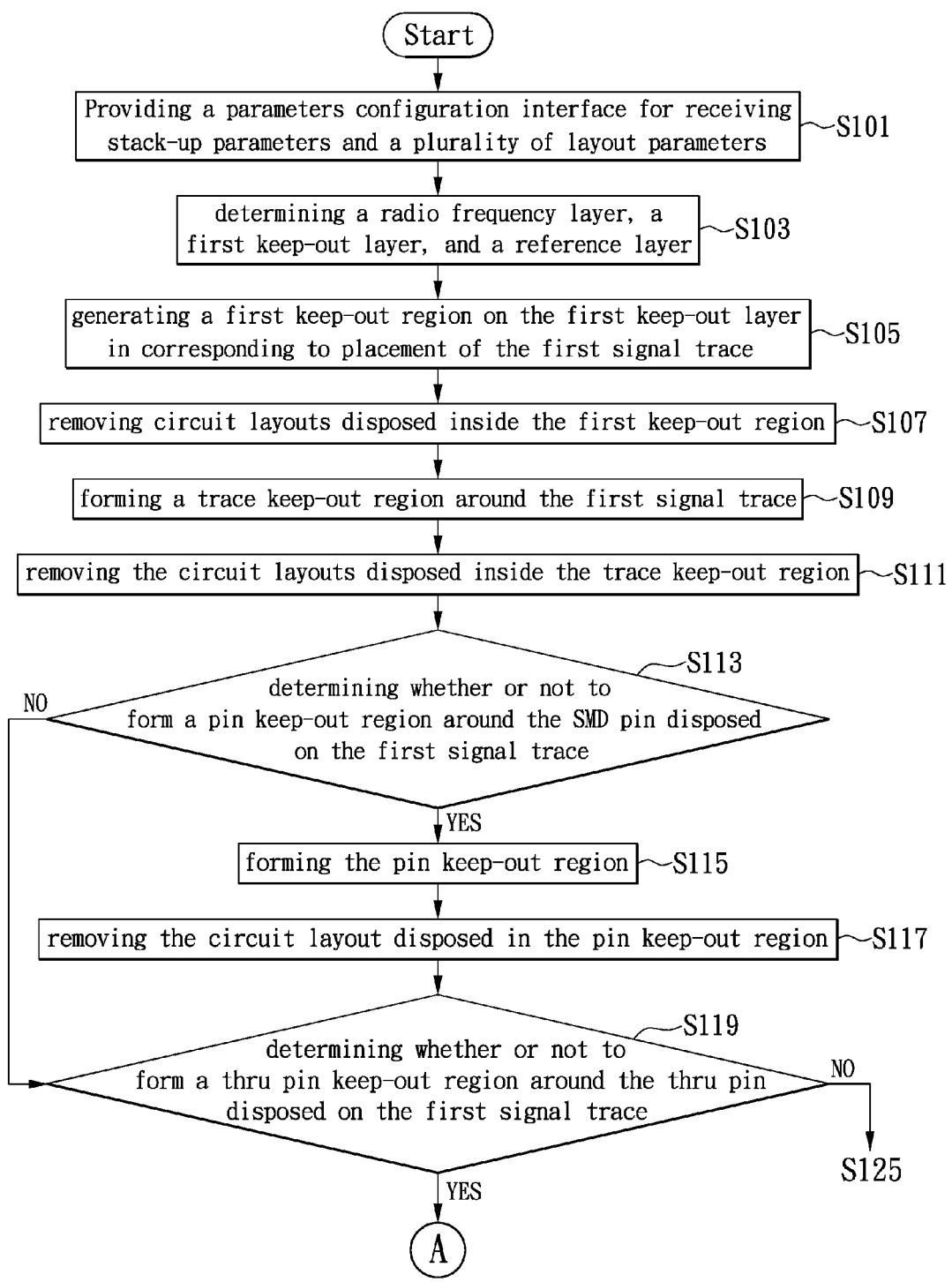
Figures 2, 5:
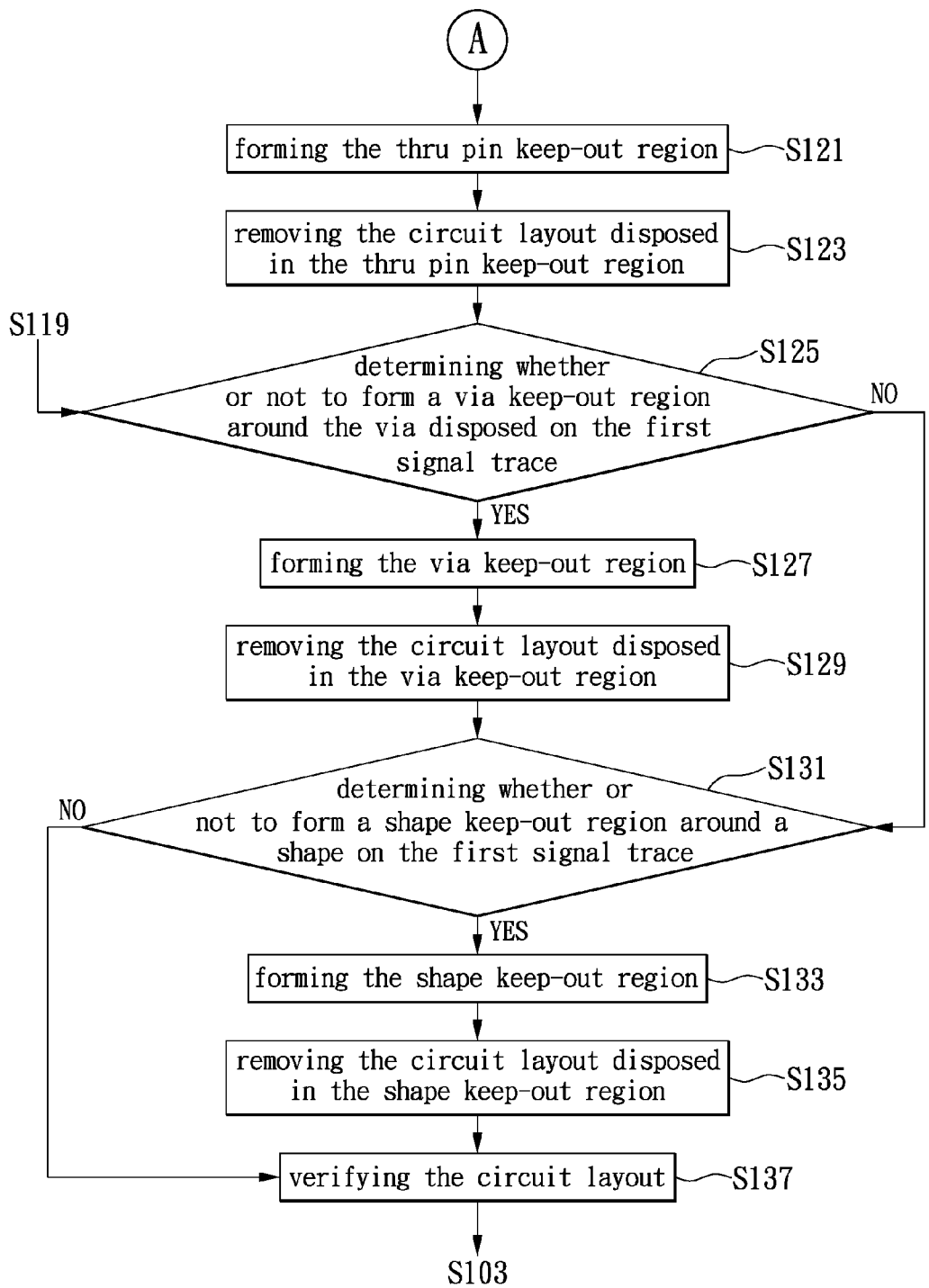

According to the above-mentioned exemplary embodiment, the present disclosure may generalize a circuit layout method for printed circuit board which can be adapted to the electronic device of the above-mentioned exemplary embodiment. Please refer to FIG. 5-1 and FIG. 5-2, in conjunction to FIG. 1. FIG. 5-1 and FIG. 5-2 are flowchart diagrams respectively illustrating a circuit layout method for a printed circuit board provided in accordance to the second exemplary embodiment of the present disclosure.

First, in the step S101, the processing unit 20 receives the stack-up parameters and a plurality of layout parameters inputted by the designer through a parameters configuration interface displayed on the display unit 10. The stack-up parameters includes the controlled radio frequency layers according to the circuit layout requirements and the corresponding keep-out layers. The layout parameters include the definition of the layout object being disposed on the signal trace by the designer according to the circuit layout structure as well as the corresponding area coverage parameters of the associated keep-out region.

Next, in the step S103, the processing unit 20 determines a radio frequency layer, a first keep-out layer, and a reference layer according to the stack-up parameter, wherein the first keep-out layer is placed between the radio frequency layer having a first signal trace disposed thereon and the reference layer. The first keep-out layer and the reference layer may be a power layer, a ground layer, or radio frequency layer, but the present disclosure is not limited thereto.

Subsequently, in the step S105, the processing unit 20 forms a first keep-out region in corresponding to the first signal trace in the first keep-out layer. Specifically, the processing unit 20 configures the area of the first keeps-out region according to the layout parameters inputted by the designer. The first keep-out region covers an orthographic projection region of the first signal trace project on the first keep out layer. In other words, the first keep-out region is disposed directly under the first signal trace.

Then, in the step S107, the processing unit 20 removes the circuit layout inside the first keep-out region to have the reference layer becomes the reference plane for the first signal trace on the radio frequency layer.

Afterward, in the step S109, the processing unit 20 forms a trace keep-out region around the first signal trace on the radio frequency layer according to the layout parameters, wherein the processing unit 20 configures the area of the trace keep-out region according to the layout parameters inputted by the designer. At the same time, the processing unit 20 adjusts the area of first keep-out region on the first keep-out layer according to the area of the trace keep-out region. In the step S111, the processing unit 20 removes the circuit layout inside the trace keep-out region.

Next, in the step S113, the processing unit 20 determines whether or not to form a pin keep-out region around the SMD pin disposed on the first signal trace. Or equivalently, the processing unit 20 determines whether or not a SMD pin has been disposed on the first signal trace and whether or not the designer has selected the SMD pin option in the layout object selection field 109 in the parameters configuration interface 101 shown in FIG. 4. If the processing unit 20 determines to form a pin keep-out region around the SMD pin disposed on the first signal trace, the processing unit 20 sequentially executes the step S115 and the step S117. On the other hand, if the processing unit 20 determines no need to form the pin keep-out region around the SMD pin disposed on the first signal trace, the processing unit executes step S119. In the step S115, the processing unit 20 forms the pin keep-out region with corresponding area configured according to the designer inputted layout parameters. Next, in the step S117, the processing unit 20 removes the circuit layout disposed inside the pin keep-out region. Moreover, the processing unit 20 can also adjust the area of the first keep-out region on the first keep-out layer according to the pin keep-out region.

In the step S119, the processing unit 20 determines whether or not to form a thru pin keep-out region around the thru pin disposed on the first signal trace. In other words, the processing unit 20 determines whether or not a thru pin has been disposed on the first signal trace and whether or not the designer has selected thru pin option in the layout object selection field 109 in the parameters configuration interface 101 shown in by FIG. 4. If the processing unit 20 determines to form a thru pin keep-out region around the thru pin disposed on the first signal trace, the processing unit 20 sequentially executes the step S121 and the step S123. On the other hand, if the processing unit 20 determines no need to form a thru pin keep-out region around the thru pin disposed on the first signal trace, the processing unit 20 executes step S125.

In the step S121, the processing unit 20 forms thru pin keep-out region with corresponding area configured according to the designer inputted layout parameters. Next, in the step S123, the processing unit 20 removes the circuit layout disposed inside the thru pin keep-out region. Moreover, the processing unit 20 can also adjust the area of first keep-out region on the first keep-out layer according to the thru pin keep-out region.

Subsequently, in the step S125, the processing unit 20 determines whether or not to form a via keep-out region around the via disposed on the first signal trace. In other words, the processing unit 20 determines whether or not a via has been disposed on the first signal trace and whether or not the designer has selected the via option in the layout object selection field 109 in the parameters configuration interface 101 shown bin FIG. 4. If the processing unit 20 determines to form a via keep-out region around the via disposed on the first signal trace, the processing unit 20 sequentially executes the step S127 and the step S129. On the other hand, if the processing unit 20 determines no need to form a via keep-out region around the via disposed on the first signal trace, the processing unit 20 executes step S131. In the step S127, the processing unit 20 forms the via keep-out region with corresponding area configured according to the designer inputted layout parameters. Next, in the step S129, the processing unit 20 removes the circuit layout disposed inside the via keep-out region. In addition the processing unit 20 can also adjust the area of first keep-out region on the first keep-out layer according to the via keep-out region.

Subsequently, in the step S131, the processing unit 20 determines whether or not to form a shape keep-out region around the shape disposed on the first signal trace. In other words, the processing unit 20 determines whether or not a shape has been disposed on the first signal trace and whether or not the designer has selected the shape option in the layout object selection field 109 in the parameters configuration interface 101 shown in FIG. 4. If the processing unit 20 determines to form a shape keep-out region around the shape disposed on the first signal trace, the processing unit 20 sequentially executes the step S133 and the step S135. On the other hand, if the processing unit 20 determines no need to form a shape keep-out region around the shape disposed on the first signal trace, the processing unit 20 executes the step S137. In the step S133, the processing unit 20 forms the shape keep-out region with corresponding area configured according to the designer inputted layout parameters. Next, in the step S135, the processing unit 20 removes the circuit layout disposed inside the shape keep-out region. Moreover, the processing unit 20 can also adjust the area of first keep-out region on the first keep-out layer according to the shape keep-out region correspondingly.

Finally, after finish establishing the plurality of keep-out regions, i.e., the first keep-out region corresponding to the first signal trace, the pin keep-out region corresponding to the SMD pin, the thru pin keep-out region corresponding to the thru pin, the via keep-out region corresponding to the via, the trace keep-out region corresponding to the first signal trace, and the shape keep-out region corresponding to the shape, the processing unit 20 verifies the circuit layout (step S137). Hence, the circuit layout accurately and quickly verified so as to ensure the circuit layout quality and avoid omissions or misjudging occurred in the manual operation.

Figure 6:
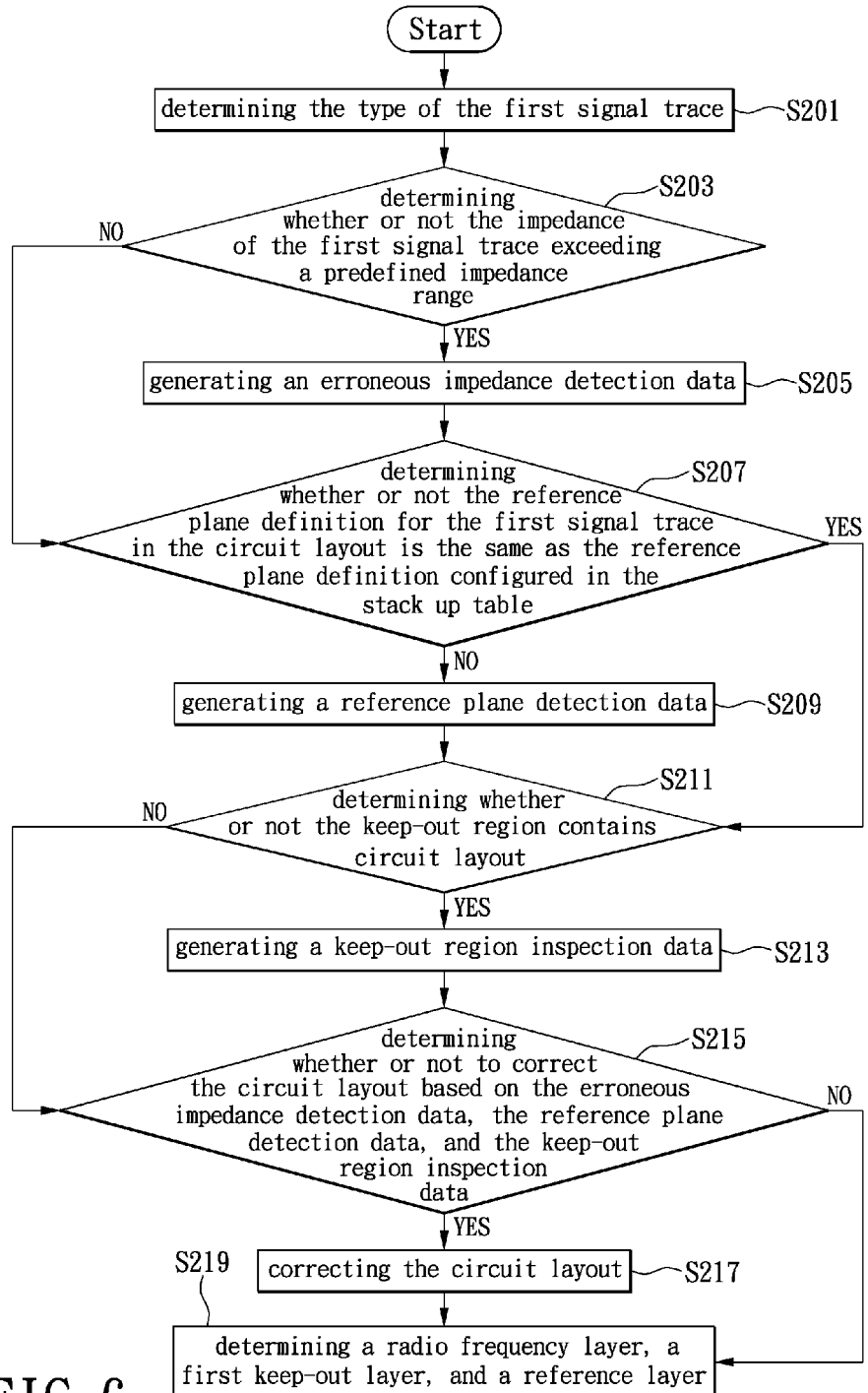
FIG. 6 is flowchart diagrams of circuit layout inspection method for the printed circuit board provided in accordance to the second exemplary embodiment of the present disclosure.

The method for verifying the circuit layout further includes the following steps. Please refer FIG. 6, which is a flowchart diagram illustrating circuit layout inspection method for printed circuit board provided in accordance to the second exemplary embodiment of the present disclosure.

In the disclosed method, the processing unit 20 can verify and inspect the overall circuit layout based on the stack-up table, the stack-up parameters and the layout parameters. The stack-up table, may for example, be the stack-up table shown in FIG. 3 and includes number of layers in the printed circuit board, the type of layers, the type of the signal trace, the reference layer corresponds to the signal trace, the impedance of signal trace, and the related layout parameter data. The corresponding parameter data for the signal trace may be generated through using external printed circuit board stack-up design software. The processing unit 20 determines the type of the first signal trace (in the step S201), such as the single-end trace or the differential trace through comparing the layout parameters of the first signal trace and the parameters of the first signal trace in the stack-up table, e.g., trace width, spacing, length, and so on. Then, the processing unit 20 determines whether or not the impedance of the first signal trace exceeding a predefined impedance range (in the step S203) according to the layout parameters, the type of the first signal trace, and the impedance of the first signal trace in the stack-up table. The predefined impedance range can be defined according to the signal impedance requirement for the actual product application. When the impedance of the first signal trace exceeds the predefined impedance range, the processing unit 20 generates an erroneous impedance detection data (step S205). On the other hand, if the processing unit 20 determines the impedance of the first signal trace is within the predefined impedance range, the processing unit 20 executes the step S207. The erroneous impedance detection data generated by the processing unit 20 is stored in the storage unit 30, and displayed on the display unit 10 for the designer to view.

Next, in the step S207, the processing unit 20 determines whether or not the reference plane definition for the first signal trace in the circuit layout is the same as the definition of the reference layer configured in the stack-up table. In another words, the processing unit 20 determines whether or not the first signal trace references to the correct reference plane. When the processing unit 20 determines that to the first signal trace references to the wrong reference plane, the processing unit 20 executes the step S209 i.e., generating the reference plane detection data. When the processing unit 20 determines that the first signal trace references to the correct reference plane, the processing unit 20 executes the step S211. The reference plane detection data generated by the processing unit 20 is stored in the storage unit 30, and displayed on the display unit 10 for designer to view.

Subsequently, in the step S211, the processing unit 20 determines whether or not the circuit layout in the plurality of keep-out regions generated has been removed. When determines that the keep-out regions generated still contain circuit layout, the processing unit 20 generates the keep-out region inspection data (in the step S213). On the other hand, when the processing unit 20 determines that there is no circuit layout inside the keep-out region generated, the processing unit 20 executes the step S215. In step S215, the designer determines whether or not to correct the circuit layout based on the reference plane detection data, the keep-out region inspection data, and the erroneous impedance detection data. When determines that the circuit layout is incorrect, the processing unit 20 corrects the circuit layout based on the reference plane detection data, the keep-out region inspection data, and the erroneous impedance detection data according to the configurations set by the designer (in the step S217). On the other hand, when determines there is no need to correct the circuit layout, the processing unit 20 executes step S219 by re-determines a radio frequency layer, a first keep-out layer, and a reference layer.

Incidentally, when determines that the circuit layout has been modified, the processing unit 20 verifies the modified circuit layout and then determines whether or not the modified circuit layout satisfy the requirement configured by the designer to properly corrects the circuit layout in the keep-out region thereby maintain the circuit layout quality and increase the overall circuit layout efficiency.

Figure 7:
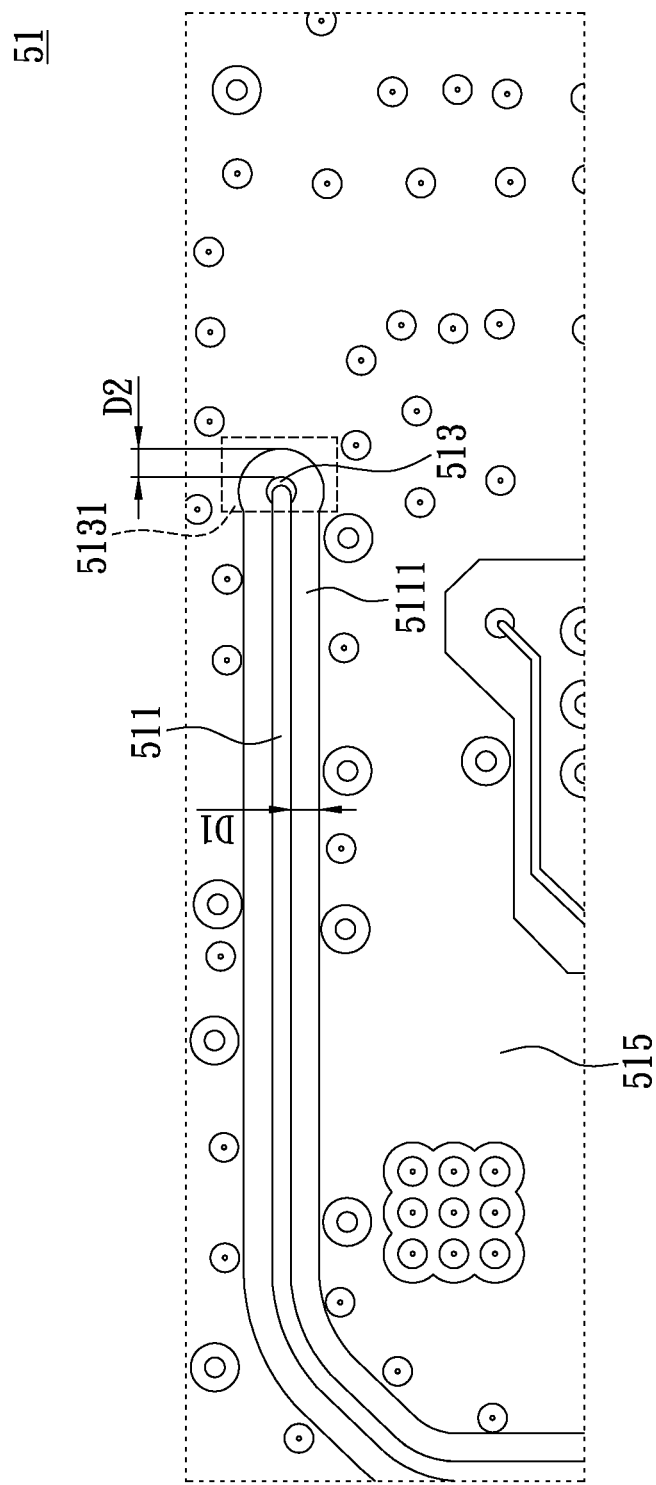
FIG. 7 is a schematic plane diagram illustrating a first signal layer of the circuit layout generated using the circuit layout method provided in accordance to the second exemplary embodiment of the present disclosure.
Figure 8:
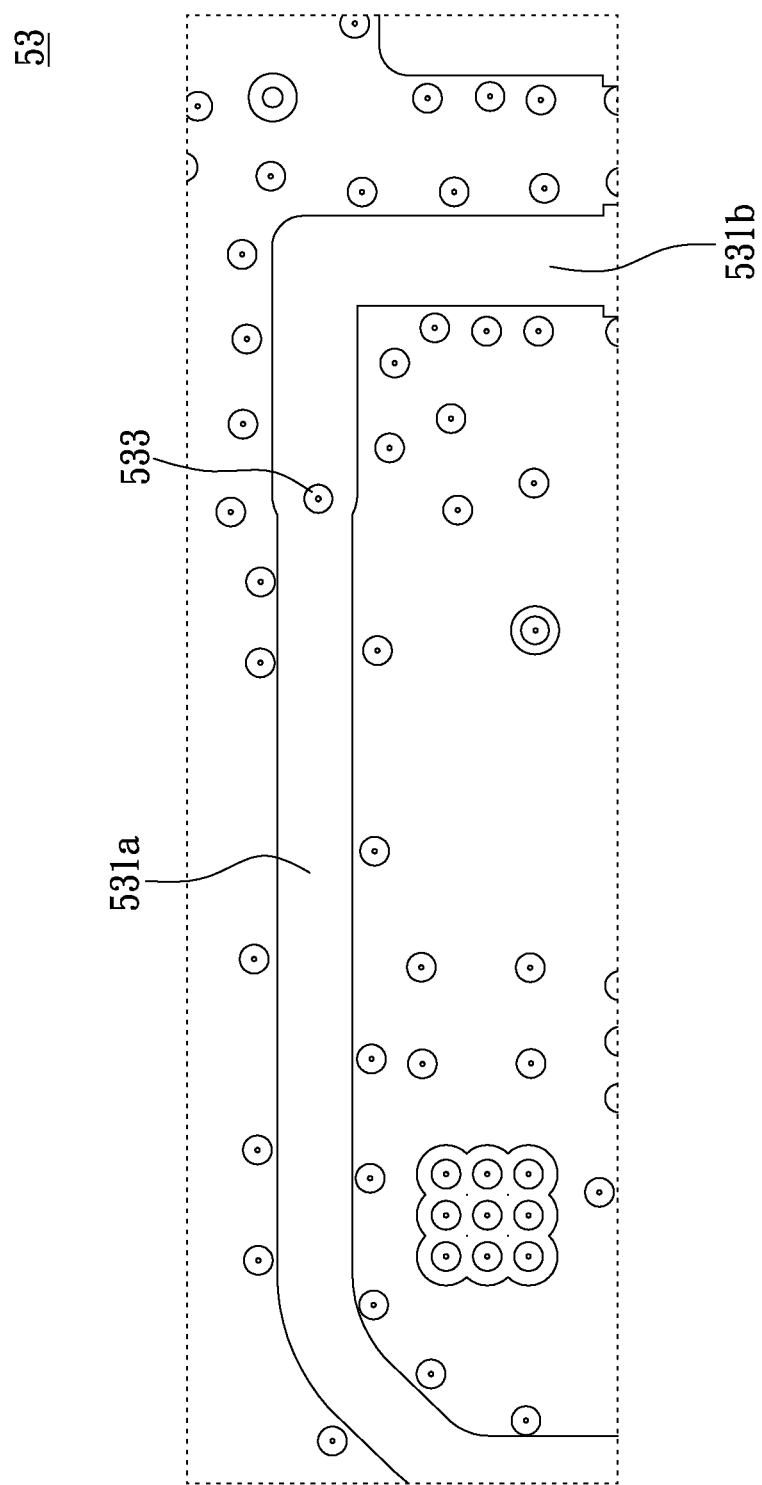
FIG. 8 is a schematic plane diagram illustrating the keep-out layer of the circuit layout generated using circuit layout method provided in accordance to the second exemplary embodiment of the present disclosure.
Figure 9:
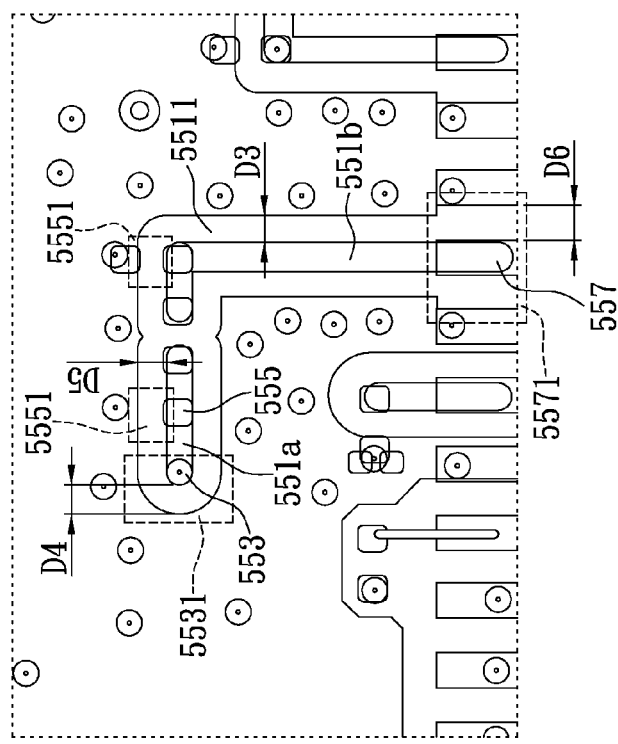
FIG. 9 is a schematic plane diagram of illustrating the second radio frequency layer of a circuit layout generated using the circuit layout method provided in accordance to the second exemplary embodiment of the present disclosure.
Figure 10:
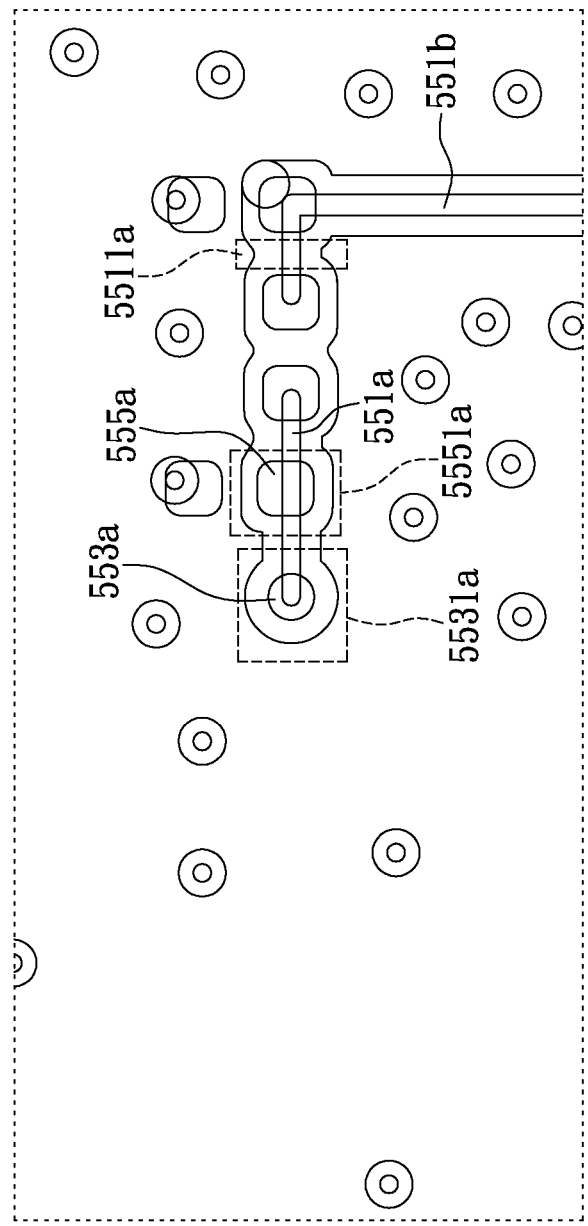
FIG. 10 is another schematic plane diagram illustrating the second radio frequency layer of a circuit layout the circuit layout method provided in accordance to the second exemplary embodiment of the present disclosure.
Figure 11:
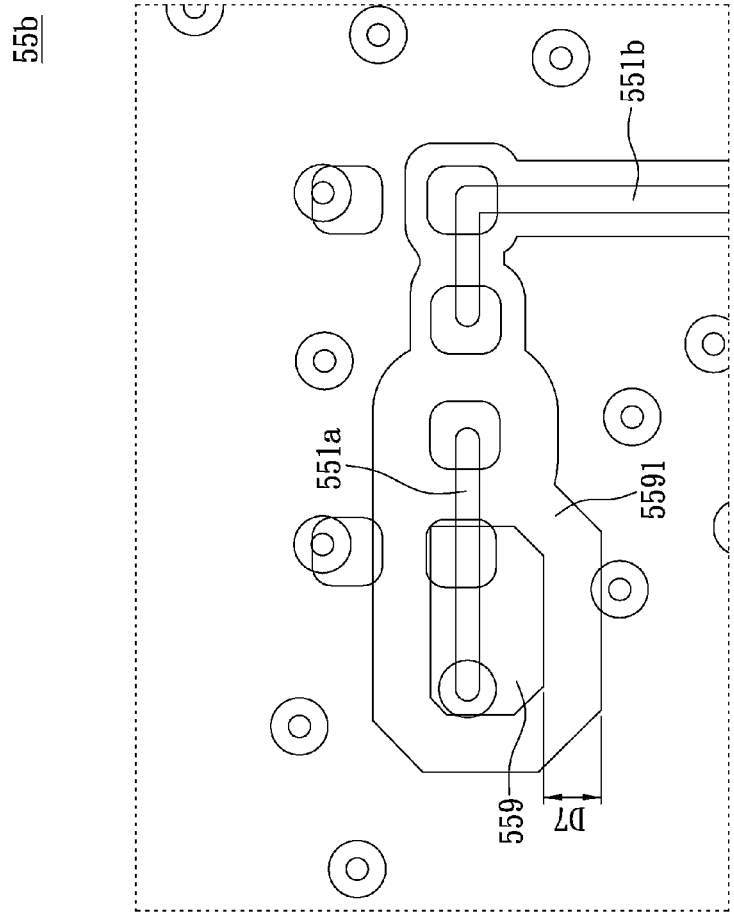
FIG. 11 is another schematic plane diagram illustrating a radio frequency layer of a circuit layout generated using the circuit layout method provided in accordance to the second exemplary embodiment of the present disclosure

Specifically, the instant embodiment provides an actual implementation of the circuit layout method. Please refer to FIG. 7~FIG. 11 in conjunction to FIG. 3. FIG. 7~FIG. 11 are diagram respectively showing the implementation of the circuit layout method provided in accordance to the second exemplary embodiment of the present disclosure. In particular, FIG. 7 is a schematic plane diagram illustrating a first signal layer of the circuit layout generated using the circuit layout method provided in accordance to the second exemplary embodiment of the present disclosure. FIG. 8 is a schematic plane diagram illustrating the keep-out layer of the circuit layout generated using circuit layout method provided in accordance to the second exemplary embodiment of the present disclosure. FIG. 9 is a schematic plane diagram of illustrating the second radio frequency layer of a circuit layout generated using the circuit layout method provided in accordance to the second exemplary embodiment of the present disclosure. The keep-out layer in FIG. 8 is placed between the first radio frequency layer in FIG. 7 and the second radio frequency layer in FIG. 9. FIG. 10 is another schematic plane diagram illustrating the second radio frequency layer of a circuit layout the circuit layout method provided in accordance to the second exemplary embodiment of the present disclosure. FIG. 11 is another schematic plane diagram illustrating a radio frequency layer of a circuit layout generated using the circuit layout method provided in accordance to the second exemplary embodiment of the present disclosure.

Please refer to FIG. 7, a first radio frequency layer 51 has a first signal trace 511 disposed thereon wherein the first signal trace 511 further has a via 513 disposed thereon. The layout objects disposed in adjacent to the first signal trace 511 include a shape 515 and a plurality of vias having different size. As described previously, the designer may through configuring the parameters configuration interface, generate the trace keep-out region 5111 and the via keep-out region 5131 around the first signal trace 511 and the via 513 on the first radio frequency layer 51, respectively. The circuit layout inside the first keep-out region in the trace keep-out region 5111 and the via keep-out region 5131 are removed subsequently.

Specifically, the trace keep-out region 5111 surrounds the first signal trace 511, wherein the trace keep-out region 5111 is formed by extending a predefined distance D1 outward from the edge of the first signal trace 511. The via keep-out region 5131 surrounds the via 513 on the first signal trace 511 and the via keep-out region 5131 extends a predefined distance D2 outward from the edge of the via 513. Hence, the predefined distance D1 and D2 respectively define the area of the trace keep-out region 5111 and the via keep-out region 5131. The area of the trace keep-out region 5111 and the via keep-out region 5131 can be configured at the field of signal trace and via in the keep-out region configuration field 107 of the parameters configuration interface 101 in FIG. 4.

At the same time, the corresponding reference layer for the first signal trace 511 on the first radio frequency layer 51 in the circuit layout is the second radio frequency layer 55 of FIG. 9. Hence, the first keep-out region 531a is generated on the first keep-out layer 53 in FIG. 8 to have the reference layer of the first signal trace 511 be the second radio frequency layer 55 of FIG. 9. Hence, the area of the first keep-out region 531a covers an orthographic projection region of the first signal trace 511 on the first radio frequency layer 51, wherein the via 533 located in the first keep-out region 531a on the second radio frequency layer 55 corresponds to the via 513 on the first radio frequency layer 51. The second signal trace 551a and 551b are disposed in corresponding to the layout parameters associated with the first signal trace 511 on the first radio frequency layer 51.

Similarly, as shown in FIG. 9, the reference layer for the second signal trace 551a and 551b on the second radio frequency layer 55 is the first radio frequency layer 51. Therefore, when configures the second signal trace 551a and 551b on the second radio frequency layer 55, the first keep-out region 531b in corresponding to the second signal trace 551a and 551b is also generated on the first keep-out layer 53 to have the reference layer for the second signal trace 551a and 551b be the first radio frequency layer 51 of FIG. 7. Hence, as depicted by FIG. 8, the area of the first keep-out region 531b covers an orthographic projection region of the second signal trace 551a and 551b on the second radio frequency layer 55.

Additionally, as depicted by FIG. 9, the second signal trace 551a and 551b have a plurality of layout objects including the via 553, a plurality of thru pins 555, the SMD pin 557, and so on. When the designer selects the layout objects and configures the corresponding area of the keep-out regions associated with the second signal trace 551a and 551b in the parameters configuration interface, the trace keep-out region 5511, the via keep-out region 5531, the thru pin keep-out region 5551, and the SMD pin keep-out region 5571 are respectively formed around the second signal trace 551a and 551b, the via 553, the thru pins, and the SMD pin 5571 disposed on the second radio frequency layer 55.

The trace keep-out region 5511 extends a predefined distance D3 outward from the edge of the second signal trace 551a and 551b, so that the distance D3 defines the area of the trace keep-out region 5511. The via keep-out region 5131 extends a predefined distance D4 outward from the edge of the via 553, so that the distance D4 defines the area of the via keep-out region 5531. The thru pin keep-out region 5551 extends a predefined distance D5 outward from the edge of the thru pin 555 so that the distance D5 defines the area of the via keep-out region 5531. The pin keep-out region 5571 extends a predefined distance D6 outward from the edge of the SMD pin 557 so that the distance D6 defines the area of the pin keep-out region 5571.

Figure 4:
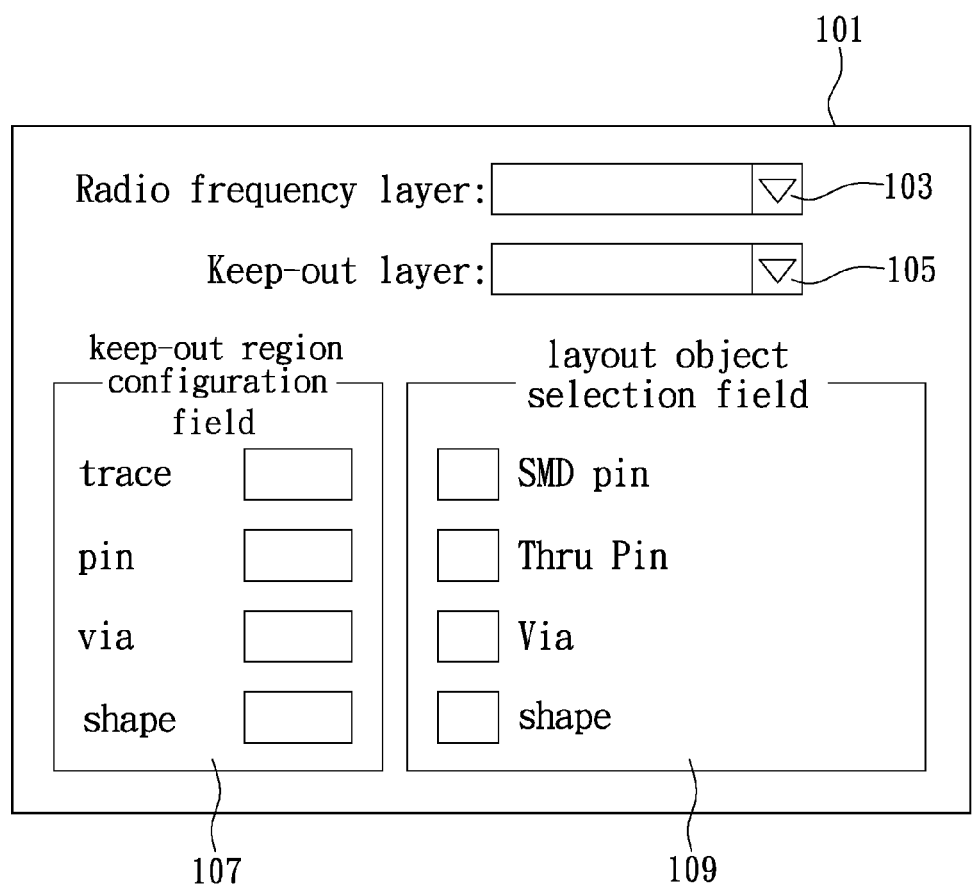
FIG. 4 is a diagram illustrating a parameters configuration interface provided by the electronic device in accordance to the first exemplary embodiment of the present disclosure.

It is worth to mention that the trace keep-out region 5511, the via keep-out region 5531, the thru pin keep-out region 5551, and the pin keep-out region 5571 are generated as the designer has selected the SMD pin, the thru pin, and the via in the layout object selection field 109 shown in FIG. 4 with the entries of corresponding area in keep-out region configuration field 107, wherein the entries of area correspond to the keep-out regions associated with the second signal trace 551a and 551b (i.e., D3), the via 553 (i.e., D4), the thru pin 555 (i.e., D5), and the SMD pin (.e, D6).

Moreover, when the designer modifies the circuit layout, i.e., when the designer changes the size and/or the corresponding keep-out region area of the via 553 or the thru pin 555 being disposed on the second signal trace 551a and 551b on the second radio frequency layer 55, the area of the corresponding keep-out regions in the second radio frequency layer 55 are instantly adjusted, accordingly. As shown in FIG. 10, when the size of the via 553 and the thru pin 555a on the second signal trace 551a and 551b are adjusted, the area of the corresponding via keep-out region 5531, the thru pin keep-out region 5551, and the pin keep-out region 5571 are adjusted, accordingly.

Furthermore, if a shape has been disposed on the second signal trace 551a of the second radio frequency layer 55, a shape keep-out region is instantly disposed around the shape. For instance, as a heptagonal shape 559 has been disposed on the second signal trace 551a of the second radio frequency layer 55b, the shape keep-out region 5591 is then formed around the shape 559. Specifically, the shape keep-out region 5591 extends a predefined distance D7 outward from the edge of the shape 5591 and the circuit layout inside the shape keep-out region 5591 is remove. The distance D7 may be defined through selecting the shape in the layout object selection field 109 of the parameters configuration interface 101 provided in FIG. 4 and inputting the area coverage for the corresponding shape in the keep-out region configuration field 107.

Incidentally, when the designer modifies the circuit layout of the second radio frequency layer 55, 55a or 55b, the coverage of the first keep-out region 531b of FIG. 8 in corresponding to the second signal trace 551a is also modified to have the first keep-out region 531b covers an orthographic projection region for the second signal trace 551a.

Therefore, based on the above explanation of the, those skilled in the art should be able to deduce the generation of the keep-out region and the area adjustment of the keep-out region in the circuit layout according to the present disclosure, and further descriptions are therefore omitted. It is worth to mention that FIG. 5-1, FIG. 5-2, and FIG. 6 are only serve to illustrate elaborate the circuit layout method for printed circuit board in accordance to the instant embodiment, thus the present disclosure is not limited thereto. Similarly, FIG. 7 to FIG. 11 only serves to illustrate actual implementation of the disclosed circuit layout method and the present disclosure is not limited thereto.

It is worth to mention that, in practice, the circuit layout method provided in the instant embodiment may be implemented using commonly seen circuit layout design software, such as Allegro Layout Tool. In particular, the designer may install the installation sources and configures the shortcuts in the Allegro Layout Tool program. Such that, the designer can run the above-mentioned circuit layout design program in the electronic device after the installation by means of the shortcuts configured. And a window of parameters configuration interface as shown in FIG. 4 may be generated to facilitate the designer with the circuit layout design, however, the present disclosure is not limited thereto.

In addition, the present disclosure also discloses a computer readable recording medium, wherein the computer readable stores the computer executable program for executing the aforementioned circuit layout method. The computer readable recording medium may be a floppy disk, a hard disk, a compact disk (CD), a flash drive, a magnetic tape, an accessible online storage database or any type of storage medium having the similar functionality known to those skilled in the art.

In summary, the present disclosure provides a circuit layout method which may actively form a plurality of keep-out regions in corresponding to the impedance controlled signal trace, wherein the designer can configure the area of the keep-out region at any time to have the signal trace in the circuit layout fulfilling the signal quality requirements of product. Hence, the designer can through utilizing the method reduce the circuit layout time while increase increases the circuit layout design efficiency thereby reduce the cost and product development time.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A circuit layout method for printed circuit board, executed by an electronic device, the method comprising:
the electronic device providing a parameter configuration interface for receiving a stack-up parameters and a plurality of layout parameters;
the electronic device determining a radio frequency layer, a first keep-out layer, and a reference layer according to the stack-up parameters, wherein the first keep-out layer is placed between the radio frequency layer having a first signal trace disposed thereon and the reference layer;
the electronic device forming a first keep-out region corresponding to the first signal trace in the first keep-out layer; and
the electronic device removing the circuit layout in the first keep-out region.

2. The circuit layout method for printed circuit board according to claim 1, wherein the step of forming the first keep-out region corresponding to the first signal trace in the first keep-out layer comprises:
configuring the area of the first keep-out region according to the layout parameters, wherein the first keep-out region covers an orthographic projection area of the first signal trace on the first keep-out layer.

3. The circuit layout method for printed circuit board according to claim 1, further comprising:
determining a second keep-out layer according to the stack-up parameters, wherein the second keep-out layer is placed between the radio frequency layer and the reference layer;
forming a second keep-out region in corresponding to the first signal trace in the second keep-out layer;
removing the circuit layout in the second keep-out region to have the reference layer becoming the reference plane of the first signal trace.

4. The circuit layout method for printed circuit board according to claim 1, further comprising:
forming a pin keep-out region around a surface mount device (SMD) pin disposed on the first signal trace;
determining the area of the pin keep-out region according to the layout parameters; and
removing the circuit layout in the pin keep-out region.

5. The circuit layout method for printed circuit board according to claim 4, further comprising:
adjusting the area of first keep-out region on the first keep-out layer according to the area of the pin keep-out region.

6. The circuit layout method for printed circuit board according to claim 1, further comprising:
forming a thru pin keep-out region around a thru pin disposed on the first signal trace;
determining the area of the thru pin keep-out region according to the layout parameters; and
removing the circuit layout in the thru pin keep-out region.

7. The circuit layout method for printed circuit board according to claim 6, further comprising:
adjusting the area of first keep-out region on the first keep-out layer according to the area of the thru pin keep-out region.

8. The circuit layout method for printed circuit board according to claim 1, further comprising:
forming a via keep-out region around a via disposed on the first signal trace;
determining the area of the via keep-out region according to the layout parameters; and
removing the circuit layout in the via keep-out region.

9. The circuit layout method for printed circuit board according to claim 8, further comprising:
adjusting the area of first keep-out region on the first keep-out layer according to the area of the via keep-out region.

10. The circuit layout method for printed circuit board according to claim 1, further comprising:
forming a shape keep-out region around a shape disposed on the first signal trace;
determining the area of the shape keep-out region according to the layout parameters; and
removing the circuit layout in the shape keep-out region.

11. The circuit layout method for printed circuit board according to claim 10, further comprising:
adjusting the area of first keep-out region on the first keep-out layer according to the area of the shape keep-out region.

12. The circuit layout method for printed circuit board according to claim 1, further comprising:
disposing a trace keep-out region around the first signal trace;
determining the area of the trace keep-out region according to the layout parameters; and
removing the circuit layout in the trace keep-out region.

13. The circuit layout method for printed circuit board according to claim 12, further comprising:
adjusting the area of first keep-out region on the first keep-out layer according to the area of the trace keep-out region.

14. The circuit layout method for printed circuit board according to claim 12, further comprising:
determining the impedance of the first signal trace according to a stack-up table; and
generating an erroneous impedance detection data if the impedance of the first signal trace exceeds a predefined impedance range.

15. The circuit layout method for printed circuit board according to claim 1, further comprising:
generating a plurality of keep-out regions according to the layout parameters;
verifying whether the circuit layout in the keep-out regions has been removed; and
generating a keep-out region inspection data when the keep-out regions have circuit layouts disposed therein.

16. The circuit layout method for printed circuit board according to claim 15, wherein the keep-out regions comprise the first keep-out region corresponding to the first signal trace, a pin keep-out region corresponding to a SMD pin, a thru pin keep-out region corresponding to a thru pin, a via keep-out region corresponding to a via, a trace keep-out region corresponding to the first signal trace, a shape keep-out region corresponding to a shape.

17. The circuit layout method for printed circuit board according to claim 1, further comprising:
disposing a second signal trace on the reference layer in corresponding to the first signal trace according to the layout parameters.

18. An electronic device, comprising:
a display unit, for displaying a parameter configuration interface;
a storage unit, for storing a plurality of stack-up parameters and a plurality of layout parameters; and
a process unit, for executing the following steps:
providing the parameter configuration interface for receiving a stack-up parameters and a plurality of layout parameters;
determining a radio frequency layer, a first keep-out layer, and a reference layer according to the stack-up parameters, wherein the first keep-out layer is placed between the radio frequency layer having a first signal trace disposed thereon and the reference layer;
forming a first keep-out region in corresponding to the first signal trace in the first keep-out layer; and
removing the circuit layout in the first keep-out region.

19. The electronic device according to claim 18, wherein the processing unit determines the area of the first keep-out region according to the layout parameters, wherein the first keep-out region is placed directly under the first signal trace, and the area of the first keep-out region covers the orthogonal projection area of the first signal trace on the first keep-out layer.

20. The electronic device according to claim 18, wherein the processing unit configures a pin keep-out region, a thru pin keep-out region, a via keep-out region, a shape keep-out region, and a trace keep-out region according to the layout parameters, wherein the pin keep-out region is disposed around a SMD pin on the first signal trace, the thru pin keep-out region is disposed around a thru pin on the first signal trace, the via keep-out region is disposed around a via on the first signal trace, the shape keep-out region is disposed around a shape on the first signal trace, and the trace keep-out region is disposed around a trace on the first signal trace.

21. The electronic device according to claim 18, wherein the processing unit determines the area associated with the pin keep-out region, the thru pin keep-out region, the via keep-out region, the shape keep-out region, and the trace keep-out region according to the layout parameters, and removes the circuit layout in the pin keep-out region, the thru pin keep-out region, the via keep-out region, the shape keep-out region, and the trace keep-out region.

22. A non-transitory computer readable recording medium, wherein the computer readable recording medium stores a computer executable program, when the computer readable recording medium is read by a processor, the processor executes the computer executable program and implements the steps according to claim 1.

* * * * *